US012604272B2

(12) United States Patent (10) Patent No.: US 12,604,272 B2
Laselva et al. (45) Date of Patent: Apr. 14, 2026

(54) HANDLING OF MEASUREMENT RELAXATION AND OTHER ACTIVITY SKIPPING

(71) Applicant: Nokia Technologies Oy, Espoo (FI)

(72) Inventors: Daniela Laselva, Aalborg (DK); Mads Lauridsen, Aalborg (DK); Jorma Johannes Kaikkonen, Oulu (FI); Riikka Karoliina Dimnik, Espoo (FI); Lars Dalsgaard, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 318 days.

(21) Appl. No.: 18/260,866

(22) PCT Filed: Nov. 3, 2021

(86) PCT No.: PCT/FI2021/050744
§ 371 (c)(1),
(2) Date: Jul. 10, 2023

(87) PCT Pub. No.: WO2022/152961
PCT Pub. Date: Jul. 21, 2022

(65) Prior Publication Data
US 2024/0080772 A1 Mar. 7, 2024

Related U.S. Application Data

(60) Provisional application No. 63/137,487, filed on Jan. 14, 2021.

(51) Int. Cl.
*H04W 52/02* (2009.01)
*H04W 24/10* (2009.01)

(52) U.S. Cl.
CPC ....... *H04W 52/0245* (2013.01); *H04W 24/10* (2013.01); *H04W 52/0229* (2013.01)

(58) Field of Classification Search
CPC ............. H04W 52/0245; H04W 24/10; H04W 52/0229; H04W 52/0235; H04W 52/028;
(Continued)

(56) References Cited

U.S. PATENT DOCUMENTS

2018/0332532 A1* 11/2018 Johansson ............. H04W 24/02
2019/0320490 A1* 10/2019 Liu ........................ H04W 24/10
(Continued)

FOREIGN PATENT DOCUMENTS

CN        111278028 A     6/2020
WO    2020/164903 A1    8/2020

OTHER PUBLICATIONS

Extended European Search Report for corresponding European Application No. 21919203.6, Oct. 25, 2024, 7 pages.
(Continued)

*Primary Examiner* — Kibrom T Hailu
(74) *Attorney, Agent, or Firm* — Carter, DeLuca & Farrell LLP

(57) ABSTRACT

Certain example embodiments provide systems, methods, apparatuses, and computer program products for handling of measurements relaxation and other activity skipping. The user equipment (UE) may be allowed to relax its various measurements if one or more radio link quality-based relaxation conditions are satisfied and based on whether the UE is also allowed, at the same time, to skip other activities. Based on certain embodiments, the UE may perform the measurements, if another activity has to be performed since relaxation may not provide any power saving benefit under such situation.

1 Claim, 5 Drawing Sheets

(58) Field of Classification Search
CPC ... H04W 52/0216; H04W 76/28; Y02D 30/70
See application file for complete search history.

(56) References Cited

U.S. PATENT DOCUMENTS

| | | | |
|---|---|---|---|
| 2020/0314868 A1 | 10/2020 | Tseng et al. | |
| 2024/0073729 A1* | 2/2024 | Hu | ......................... H04W 24/10 |

OTHER PUBLICATIONS

"UE Power Consumption Reduction in RRM Measurement," 3GPP TSG-RAN WG2 Meeting #107, R2-1908929, Agenda 11.11.6, vivo, CMCC, Xiaomi, Intel, Huawei, Hisilicon, Apple, LG Electronics Inc., Aug. 26-30, 2019, pp. 1-3.

"New WID: UE Power Saving in NR", 3GPP TSG RAN Meetings #84, RP-191607, Agenda: 9.4.6, CATT, Jun. 3-6, 2019, 5 pages.

"Revised WID UE Power Saving Enhancements for NR", 3GPP TSG RAN meeting #88e, RP-200938, Agenda: 9.10.7, MediaTek Inc, Jun. 29-Jul. 3, 2020, 5 pages.

"3rd Generation Partnership Project; Technical Specification Group Radio Access Network; NR; Requirements for support of radio resource management (Release 16)", 3GPP TS 38.133, V16.5.0, Sep. 2020, 1608 pages.

"3rd Generation Partnership Project; Technical Specification Group Radio Access Network; NR; Radio Resource Control (RRC) protocol specification (Release 16)", 3GPP TS 38.331, V16.2.0, Sep. 2020, pp. 1-921.

"3rd Generation Partnership Project; Technical Specification Group Radio Access Network; NR; User Equipment (UE) procedures in Idle mode and RRC Inactive state (Release 16)", 3GPP TS 38.304, V16.2.0, Sep. 2020, pp. 1-39.

"Discussions on UE power saving for RLM and BM", 3GPP TSG-RAN WG4 Meeting #97-e, R4-2016150, Agenda: 12.9.2, Ericsson, Nov. 2-13, 2020, pp. 1-4.

"3rd Generation Partnership Project; Technical Specification Group Radio Access Network; Evolved Universal Terrestrial Radio Access (E-UTRA); User Equipment (UE) procedures in idle mode (Release 16)", 3GPP TS 36.304, V16.2.0, Sep. 2020, pp. 1-64.

"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331, V16.2.1, Sep. 2020, pp. 1-1081.

"3rd Generation Partnership Project; Technical Specification Group Radio Access Network; Evolved Universal Terrestrial Radio Access (E-UTRA); Requirements for support of radio resource management (Release 17)", 3GPP TS 36.133, V17.0.0, Dec. 2020, 3857 pages.

International Search Report and Written Opinion received for corresponding Patent Cooperation Treaty Application No. PCT/FI2021/050744, dated Jan. 21, 2022, 15 pages.

"Report of email discussion [105bis#29][NR/Power Saving] RRM solutions", 3GPP TSG-RAN WG2 Meeting #106, R2-1908249, Agenda: 11.11.5, MediaTek Inc, May 13-17, 2019, pp. 1-20.

"3rd Generation Partnership Project; Technical Specification Group Radio Access Network; NR; Study on User Equipment (UE) power saving in NR (Release 16)", 3GPP TR 38.840, V16.0.0, Jun. 2019, pp. 1-74.

* cited by examiner

100

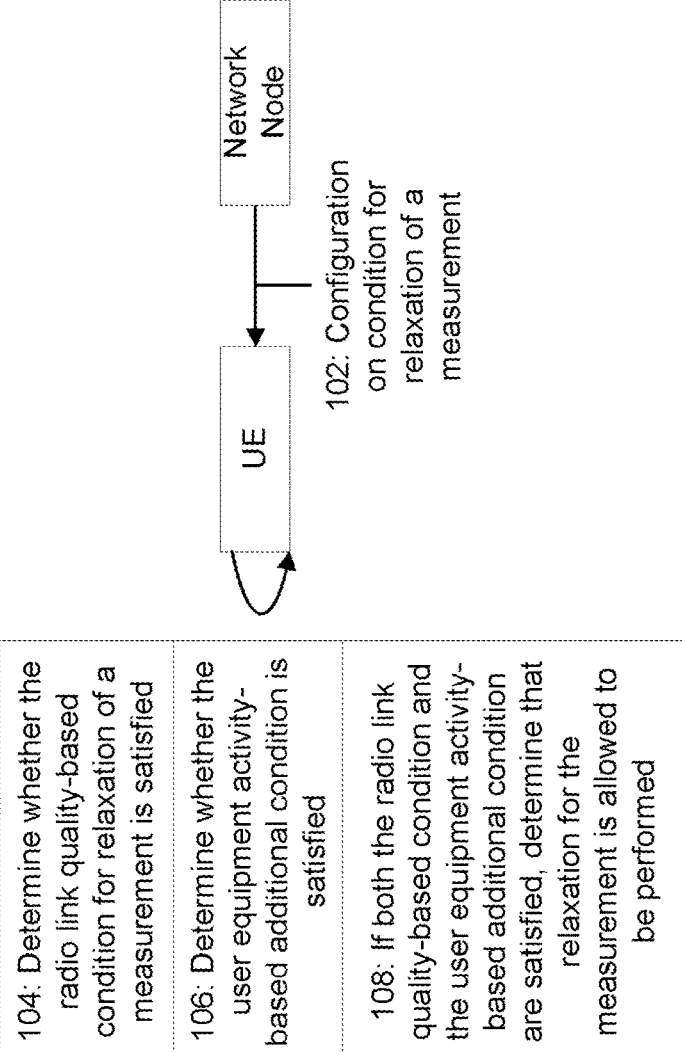

Network Node

UE

102: Configuration on condition for relaxation of a measurement

104: Determine whether the radio link quality-based condition for relaxation of a measurement is satisfied 106: Determine whether the user equipment activity-based additional condition is satisfied 108: If both the radio link quality-based condition and the user equipment activity-based additional condition are satisfied, determine that relaxation for the measurement is allowed to be performed

302 — Transmit, to a user equipment, a configuration on condition for relaxation of a measurement

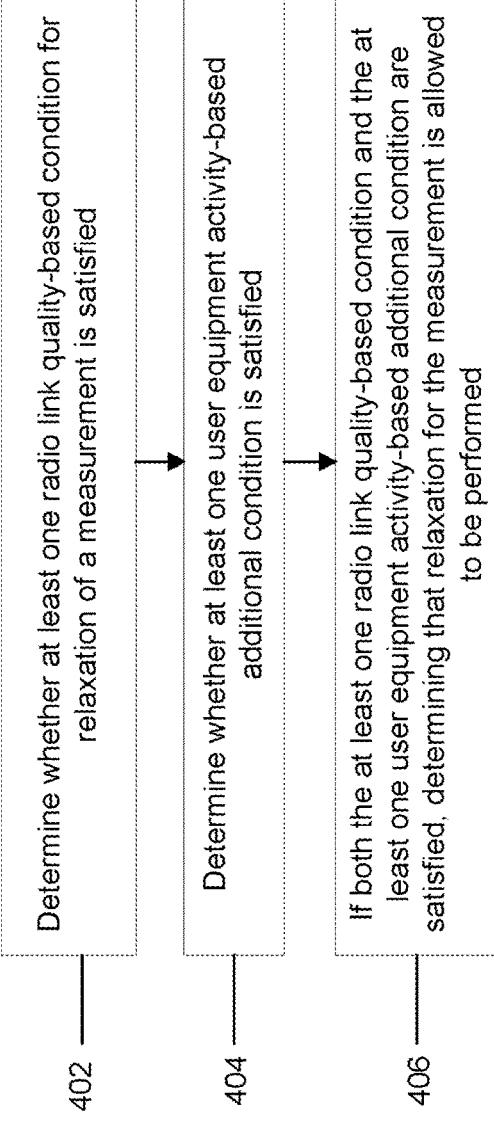

400

402 — Determine whether at least one radio link quality-based condition for relaxation of a measurement is satisfied 404 — Determine whether at least one user equipment activity-based additional condition is satisfied 406 — If both the at least one radio link quality-based condition and the at least one user equipment activity-based additional condition are satisfied, determining that relaxation for the measurement is allowed to be performed

Fig. 4

HANDLING OF MEASUREMENT RELAXATION AND OTHER ACTIVITY SKIPPING

RELATED APPLICATION

This application was originally filed as PCT Application No. PCT/FI2021/050744 on Nov. 3, 2021, which claims priority from U.S. Provisional Application No. 63/137,487, filed on Jan. 14, 2021, each of which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for handling of measurement relaxation and other activity skipping.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology 5G is mostly built on a new radio (NR), but a 5G network can also build on E-UTRA radio. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

According to a first embodiment, a method may include transmitting, to a user equipment (UE), a configuration on condition for relaxation of a measurement. The configuration may indicate at least one of whether a radio link quality-based condition only or both the radio link quality-based condition and at least one user equipment activity-based additional condition is required to be evaluated to determine the relaxation of the measurement, or a configuration on the at least one user equipment activity-based additional condition. The configuration may be transmitted to the UE via a radio resource control (RRC) message.

In a variant, the configuration on condition for relaxation of the measurement may further indicate a configuration on the radio link quality-based condition. Alternatively or additionally, the configuration may define either different use or interpretation of, e.g., a wake-up signal (WUS), or bits in the WUS. The definition may be used by the UE to determine implicitly or explicitly whether at least one UE activity-based condition for the relaxation is satisfied. In certain embodiments, the at least one user equipment activity-based additional condition may comprise at least one user equipment activity in addition to the measurement is allowed to be skipped or relaxed. In certain embodiments, the at least one user equipment activity-based additional condition may comprise at least one of: a wake up signal ordering the user equipment to monitor a downlink control signal during a discontinuous reception on duration is not received, a wake up signal indicating the user equipment to skip monitoring of a downlink control signal during a discontinuous reception on duration is received, a wake up signal indicating the user equipment to activate the relaxation of the measurement is received, a wake up signal ordering the user equipment to stop relaxing or skipping the measurement is not received, a dormancy indication indicating that a bandwidth part has become non-dormant is not received, a dormancy indication indicating that a bandwidth part has become dormant is received, a dormancy indication indicating the user equipment to activate the relaxation of the measurement is received, a dormancy indication ordering the user equipment to stop relaxing or skipping the measurement on the associated bandwidth part is not received, or a layer 1 reference signal received power measurement or report is allowed to be skipped.

In certain embodiments, the method may further comprise transmitting a wake up signal that indicates the user equipment to enter or stop the relaxation of the measurement, in an explicit or implicit way. In certain embodiments, the method may further comprise transmitting a dormancy indication that indicates the user equipment to enter or stop the relaxation of the measurement on a bandwidth part, in an explicit or implicit way.

In certain embodiments, the configuration may further comprise a configuration of an upper bound for the relaxation of the measurement. In certain embodiments, the measurement relaxation may apply to at least one of a radio link monitoring measurement, a beam failure detection measurement, or a radio resource management measurement.

According to a second embodiment, an apparatus may include at least one processor and at least one memory comprising computer program code. The at least one memory and computer program code may be configured, with the at least one processor, to cause the apparatus at least to transmit, to a user equipment, a configuration on condition for relaxation of a measurement. The configuration may indicate at least one of whether a radio link quality-based condition only or both the radio link quality-based condition and at least one user equipment activity-based additional condition is required to be evaluated to determine the relaxation of the measurement, or a configuration on the at least one user equipment activity-based additional condition. The configuration may be transmitted to the UE via a RRC message.

In a variant, the configuration on condition for relaxation of the measurement may further indicate a configuration on the radio link quality-based condition. Alternatively or additionally, the configuration may define either different use or interpretation of, e.g., WUS, or bits in the WUS. The definition may be used by the UE to determine implicitly or explicitly whether at least one UE activity-based condition for the relaxation is satisfied. In certain embodiments, the at least one user equipment activity-based additional condition may comprise at least one user equipment activity in addition to the measurement is allowed to be skipped or relaxed. In certain embodiments, the at least one user equipment activity-based additional condition may comprise at least one of: a wake up signal ordering the user equipment to monitor a downlink control signal during a discontinuous reception on duration is not received, a wake up signal indicating the user equipment to skip monitoring of a downlink control signal during a discontinuous reception on duration is received, a wake up signal indicating the user equipment to activate the relaxation of the measurement is received, a wake up signal ordering the user equipment to stop relaxing or skipping the measurement is not received, a dormancy indication indicating that a bandwidth part has become non-dormant is not received, a dormancy indication indicating that a bandwidth part has become dormant is received, a dormancy indication indicating the user equipment to activate the relaxation of the measurement is received, a dormancy indication ordering the user equipment to stop relaxing or skipping the measurement on the associated bandwidth part is not received, or a layer 1 reference signal received power measurement or report is allowed to be skipped.

In certain embodiments, the at least one memory and computer program code may be configured, with the at least one processor, to cause the apparatus at least to transmit a wake up signal that indicates the user equipment to enter or stop the relaxation of the measurement, in an explicit or implicit way. In certain embodiments, the at least one memory and computer program code may be configured, with the at least one processor, to cause the apparatus at least to transmit a dormancy indication that indicates the user equipment to enter or stop the relaxation of the measurement on a bandwidth part, in an explicit or implicit way.

In certain embodiments, the configuration may further comprise a configuration of an upper bound for the relaxation of the measurement. In certain embodiments, the measurement relaxation may apply to at least one of a radio link monitoring measurement, a beam failure detection measurement, or a radio resource management measurement.

According to a third embodiment, a method may include determining, by a user equipment, whether at least one radio link quality-based condition for relaxation of a measurement is satisfied. The method may include determining whether at least one user equipment activity-based additional condition is satisfied. The method may include if both the at least one radio link quality-based condition and the at least one user equipment activity-based additional condition are satisfied, determining that relaxation for the measurement is allowed to be performed.

In certain embodiments, the at least one user equipment activity-based additional condition may comprise that at least one user equipment activity in addition to the measurement is allowed to be skipped or relaxed. In certain embodiments, the determining may further comprise determining whether at least one user equipment activity-based additional condition is satisfied based on at least one of whether a wake up signal ordering the user equipment to monitor a downlink control signal during a discontinuous reception on duration is received, whether a wake up signal indicating the user equipment to skip monitoring of a downlink control signal during a discontinuous reception on duration is received, whether a wake up signal indicating the user equipment to activate the relaxation of the measurement is received, whether a wake up signal ordering the user equipment to stop relaxing or skipping the measurement is received, whether a dormancy indication indicating that a bandwidth part has become non-dormant is received, whether a dormancy indication indicating that a bandwidth part becomes dormant is received, whether a dormancy indication indicating the user equipment to activate the relaxation of the measurement is received, whether a dormancy indication ordering the user equipment to stop relaxing or skipping the measurement on the associated bandwidth part is received, or whether a layer 1 reference signal received power measurement or report is allowed to be skipped.

In certain embodiments, the method may further include receiving a configuration of the at least one radio link quality-based condition and/or the at least one user equipment activity-based additional condition. In certain embodiments, either the radio link-quality-based conditions or the user equipment activity-based additional conditions may be preconfigured or predefined at the UE, while the other one is configured by the network node. In certain embodiments, the method may further include receiving a signal, and based on a determination that the relaxation for the measurement is allowed to be performed, performing a relaxed measurement of the signal. In certain embodiments, the method may further include, based on receiving a wake up signal that indicates (implicitly or explicitly) the UE to enter the relaxation of the measurement and the at least one radio link quality-based condition being satisfied, determining that relaxation for the measurement is allowed to be performed. In some embodiments, the method may further include, based on receiving a wake up signal that indicates (implicitly or explicitly) the UE to stop the relaxation of the measurement, determining that relaxation for the measurement is not allowed to be performed.

In certain embodiments, the method may further include, based on receiving a dormancy indication that indicates (implicitly or explicitly) the UE to enter the relaxation of the measurement on a bandwidth part and the at least one radio link quality-based condition being satisfied, determining that relaxation for the measurement is allowed to be performed. In some embodiments, the method may include, based on receiving a dormancy indication that indicates (implicitly or explicitly) the UE to stop the relaxation of the measurement on a bandwidth part, determining that relaxation for the measurement is not allowed to be performed. In certain embodiments, the method may further comprise, based on a determination that a layer 1 reference signal received power measurement or reporting is allowed to be skipped and the at least one radio link quality-based condition being satisfied, determining that relaxation for the measurement is allowed to be performed.

In certain embodiments, the method may further include determining an upper bound for a relaxation level of the measurement. In some embodiments, the upper bound may be determined based on a periodicity of a layer 1 measurement and/or a periodicity of a layer 1 measurement reporting. In certain embodiments, the at least one radio link quality-based condition may be related to low mobility or a location of the user equipment or a detection error rate of the user equipment or power of a signal received by the user equipment. In certain embodiments, the method may further include receiving a configuration indicating whether the radio link quality-based condition only or both the radio link quality-based condition and the at least one user equipment activity-based additional condition is to be evaluated to determine the relaxation of the measurement. In certain embodiments, the measurement may include at least one of a radio link monitoring measurement, a beam failure detection measurement, or a radio resource management measurement.

According to a fourth embodiment, an apparatus may include at least one processor and at least one memory comprising computer program code. The at least one memory and computer program code may be configured, with the at least one processor, to cause the apparatus at least to determine whether at least one radio link quality-based condition for relaxation of a measurement is satisfied. The at least one memory and computer program code may be configured, with the at least one processor, to cause the apparatus at least to determine whether at least one user equipment activity-based additional condition is satisfied. The at least one memory and computer program code may be configured, with the at least one processor, to cause the apparatus at least to, if both the at least one radio link quality-based condition and the at least one user equipment activity-based additional condition are satisfied, determine that relaxation for the measurement is allowed to be performed.

In certain embodiments, the at least one user equipment activity-based additional condition may comprise that at least one user equipment activity in addition to the measurement is allowed to be skipped or relaxed. In certain embodiments, the at least one memory and computer program code may be configured, with the at least one processor, to cause the apparatus at least to determine whether at least one user equipment activity-based additional condition is satisfied based on at least one of whether a wake up signal ordering the user equipment to monitor a downlink control signal during a discontinuous reception on duration is received, whether a wake up signal indicating the user equipment to skip monitoring of a downlink control signal during a discontinuous reception on duration is received, whether a wake up signal indicating the user equipment to activate the relaxation of the measurement is received, whether a wake up signal ordering the user equipment to stop relaxing or skipping the measurement is received, whether a dormancy indication indicating that a bandwidth part has become non-dormant is received, whether a dormancy indication indicating that a bandwidth part becomes dormant is received, whether a dormancy indication indicating the user equipment to activate the relaxation of the measurement is received, whether a dormancy indication ordering the user equipment to stop relaxing or skipping the measurement on the associated bandwidth part is received, or whether a layer 1 reference signal received power measurement or report is allowed to be skipped.

In certain embodiments, the at least one memory and computer program code may be configured, with the at least one processor, to cause the apparatus at least to receive a configuration of the at least one radio link quality-based condition and/or the at least one user equipment activity-based additional condition. In certain embodiments, either the radio link-quality-based conditions or the user equipment activity-based additional conditions may be preconfigured or predefined at the UE, while the other one is configured by the network node. In certain embodiments, the at least one memory and computer program code may be configured, with the at least one processor, to cause the apparatus at least to receive a signal, and based on a determination that the relaxation for the measurement is allowed to be performed, performing a relaxed measurement of the signal. In certain embodiments, the at least one memory and computer program code may be configured, with the at least one processor, to cause the apparatus at least to, based on receiving a wake up signal that indicates (implicitly or explicitly) the UE to enter the relaxation of the measurement and the at least one radio link quality-based condition being satisfied, determine that relaxation for the measurement is allowed to be performed. In some embodiments, the at least one memory and computer program code may be configured, with the at least one processor, to cause the apparatus at least to, based on receiving a wake up signal that indicates (implicitly or explicitly) the UE to stop the relaxation of the measurement, determine that relaxation for the measurement is not allowed to be performed.

In certain embodiments, the at least one memory and computer program code may be configured, with the at least one processor, to cause the apparatus at least to, based on receiving a dormancy indication that indicates (implicitly or explicitly) the UE to enter the relaxation of the measurement on a bandwidth part and the at least one radio link quality-based condition being satisfied, determine that relaxation for the measurement is allowed to be performed. In some embodiments, the at least one memory and computer program code may be configured, with the at least one processor, to cause the apparatus at least to, based on receiving a dormancy indication that indicates (implicitly or explicitly) the UE to stop the relaxation of the measurement on a bandwidth part, determine that relaxation for the measurement is not allowed to be performed. In certain embodiments, the at least one memory and computer program code may be configured, with the at least one processor, to cause the apparatus at least to, based on a determination that a layer 1 reference signal received power measurement or reporting is allowed to be skipped and the at least one radio link quality-based condition being satisfied, determine that relaxation for the measurement is allowed to be performed.

In certain embodiments, the at least one memory and computer program code may be configured, with the at least one processor, to cause the apparatus at least to determine an upper bound for a relaxation level of the measurement. In some embodiments, the upper bound may be determined based on a periodicity of a layer 1 measurement and/or a periodicity of a layer 1 measurement reporting. In certain embodiments, the at least one radio link quality-based condition may be related to low mobility or a location of the user equipment or a detection error rate of the user equipment or power of a signal received by the user equipment. In certain embodiments, the at least one memory and computer program code may be configured, with the at least one processor, to cause the apparatus at least to receive a configuration indicating whether the radio link quality-based condition only or both the radio link quality-based condition and the at least one user equipment activity-based additional condition is to be evaluated to determine the relaxation of the measurement. In certain embodiments, the measurement may include at least one of a radio link monitoring measurement, a beam failure detection measurement, or a radio resource management measurement.

A fifth embodiment may be directed to an apparatus that may include circuitry configured to cause the apparatus to perform the method according to the first embodiment or the second embodiment, or any of the variants discussed above.

A sixth embodiment may be directed to an apparatus that may include means for performing the method according to the first embodiment or the second embodiment, or any of the variants discussed above. Examples of the means may include one or more processors, memory, and/or computer program codes for causing the performance of the operation.

A seventh embodiment may be directed to a computer readable medium comprising program instructions stored thereon for causing an apparatus to perform at least the method according to the first embodiment or the second embodiment, or any of the variants discussed above.

An eighth embodiment may be directed to a computer program product encoding instructions for causing an apparatus to perform at least the method according to the first embodiment or the second embodiment, or any of the variants discussed above.

BRIEF DESCRIPTION OF THE DRAWINGS

For proper understanding of example embodiments, reference should be made to the accompanying drawings, wherein:

FIG. 1 illustrates an example of handling of measurement relaxation and other activity skipping, according to some embodiments;

FIG. 4 illustrates an example flow diagram of a method, according to some embodiments;

DETAILED DESCRIPTION

Figure 2:
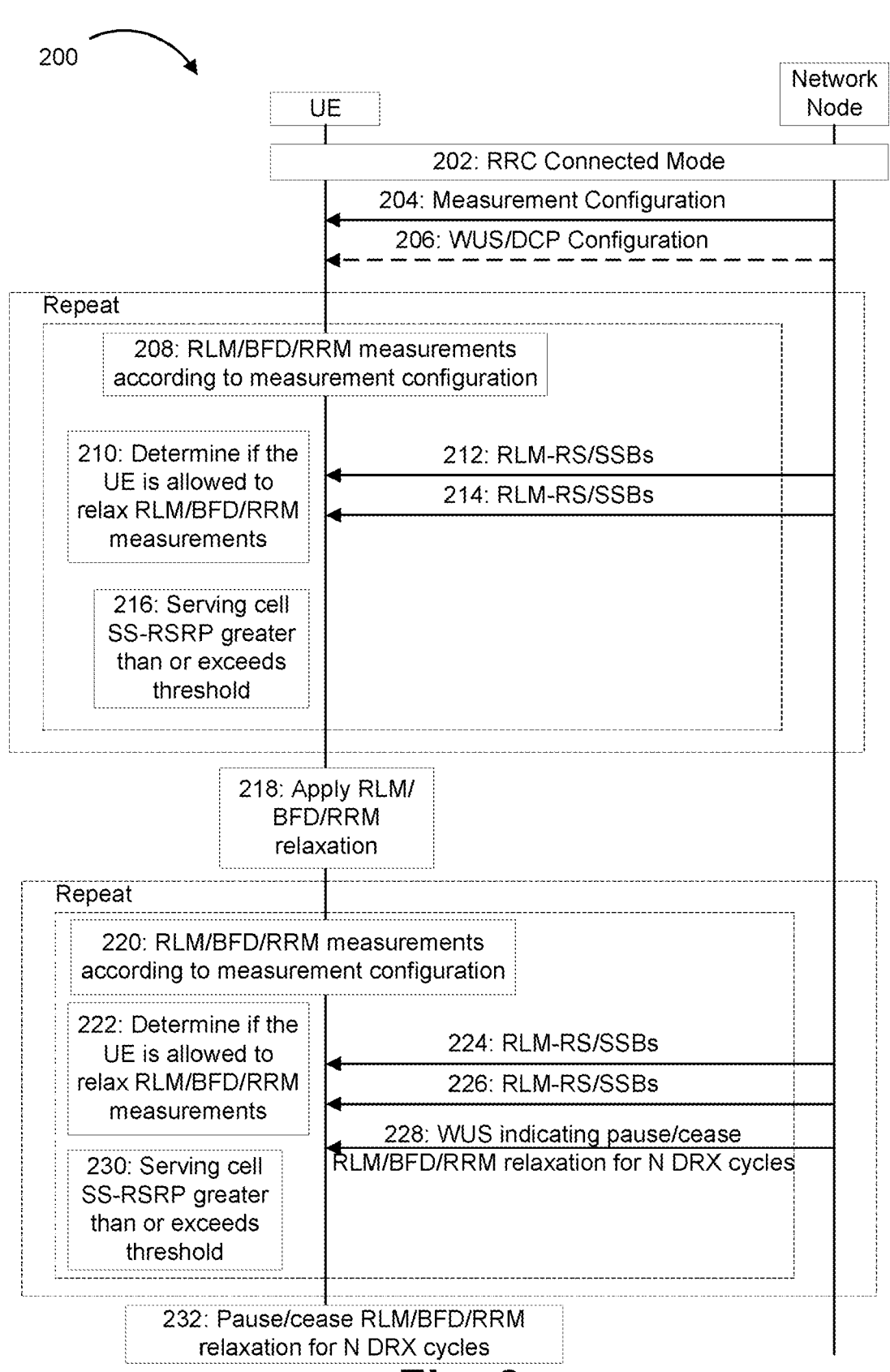
FIG. 2 illustrates an example signal diagram for handling of measurement relaxation and other activity skipping, according to some embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for handling of measurement relaxation and other activity skipping is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments. In addition, the phrase "set of" refers to a set that includes one or more of the referenced set members. As such, the phrases "set of," "one or more of," and "at least one of," or equivalent phrases, may be used interchangeably. Further, "or" is intended to mean "and/or," unless explicitly stated otherwise.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

In a connected mode, a UE may be expected to monitor the serving cell radio-link, which may be referred to as radio link monitoring (RLM). The purpose of RLM measurements and procedures may be to evaluate the serving cell radio link quality to help ensure that a downlink (DL) radio quality is sufficient for keeping the link, and to indicate to higher layers when the quality of the link is going below a defined threshold (e.g., when it is expected that the link may no longer provide a sufficient quality for the data transmission). The lower layers of the UE may indicate to higher layers when the signal quality (which may be based on the current estimated block error ratio (BLER) level, e.g., of the physical downlink control channel (PDCCH) transmissions) is below a threshold (e.g., Qout), in which case the UE may send an out-of-sync (OOS) indication. The UE may send an OOS indication when the monitored RLM reference signal(s) (RLM-RS(s)), e.g., the configured RLM-RS(s) for RLM purposes within the evaluation period for out-of-sync, are below a threshold. The reference signals used for RLM may include, for example, a synchronization signal block (SSB) or channel state information reference signal (CSI-RS).

The UE can be configured to measure up to 2, 4, or 8 RLM-RSs, depending on the frequency range (e.g., a frequency range 1 (FR1) below 3 gigahertz (GHz), FR1 above 3 GHz or frequency range 2 (FR2)). If the poor channel conditions persist, after a number of OOS indications (e.g., a N310 counter), the UE may start a timer (e.g., a T310 timer) and may declare radio link failure if the signal quality does not improve until the timer expires. However, if before the timer expires the channel conditions are improved, the UE may compare the radio link quality with a second threshold (Qin) and may send an in-sync (IS) indication to higher layers. An IS indication may be sent if at least one RLM-RS is above the threshold Qin within the evaluation period for in-sync. If a number of IS indications are sent before the T310 timer expires (e.g., a N311 counter), the UE may reset the N310 counter and the T310 timer and may not declare RLF. In good radio conditions, the UE may not send any indication to higher layers, and may measure the quality of the radio channel.

UE measurements for RLM may be based on the radio link monitoring reference signal (RLM-RS) periodicity ($T_{SSB}$, which may be the periodicity of the SSB configured for RLM) and/or in terms of the discontinuous reception (DRX) periodicity ($T_{DRX}$, which may be the DRX cycle length). P may be a factor that depends on the overlapping of SSBs and measurement gaps. Also, the RLM-RS(s) can be configured for RLM purposes, for beam failure detection (BFD) purposes, or for both as per the configuration message RadioLinkMonitoringConfig.

Some examples of configuration for SSB-based RLM are provided below in Table 1 and Table 2 for FR1 and FR2:

TABLE 1

Examples of evaluation period $T_{Evaluate\_out\_SSB}$ and $T_{Evaluate\_in\_SSB}$ for FR1 in terms of different DRX configurations

| Configuration | $T_{Evaluate\_out\_SSB}$ (milliseconds (ms)) | $T_{Evaluate\_in\_SSB}$ (ms) |
|---|---|---|
| no DRX | Max(200, Ceil(10 × P) × $T_{SSB}$) | Max(100, Ceil(5 × P) × $T_{SSB}$) |
| DRX cycle ≤ 320 ms | Max(200, Ceil(15 × P) × Max($T_{DRX}$, $T_{SSB}$)) | Max(100, Ceil(7.5 × P) × Max($T_{DRX}$, $T_{SSB}$)) |
| DRX cycle > 320 ms | Ceil(10 × P) × $T_{DRX}$ | Ceil(5 × P) × $T_{DRX}$ |

$T_{SSB}$ refers to the periodicity of the SSB configured for RLM. $T_{DRX}$ refers to the DRX cycle length. $T_{Evaluate\_out\_SSB}$ refers to the evaluation period of out-of-synch condition. $T_{Evaluate\_in\_SSB}$ refers to the evaluation period of in-synch condition. P refers to a factor that depends on the overlapping of SSBs and measurement gaps. Ceil( ) refers to a ceiling function.

9

TABLE 2

Examples of evaluation period $T_{Evaluate\_out\_SSB}$ and $T_{Evaluate\_in\_SSB}$ for FR2 in terms of different DRX configurations

| Configuration | $T_{Evaluate\_out\_SSB}$ (ms) | $T_{Evaluate\_in\_SSB}$ (ms) |
|---|---|---|
| no DRX | Max(200, Ceil(10 × P × N) × $T_{SSB}$) | Max(100, Ceil(5 × P × N) × $T_{SSB}$) |
| DRX cycle ≤ 320 ms | Max(200, Ceil(15 × P × N) × Max($T_{DRX}$, $T_{SSB}$)) | Max(100, Ceil(7.5 × P × N) × Max($T_{DRX}$, $T_{SSB}$)) |
| DRX cycle > 320 ms | Ceil(10 × P × N) × $T_{DRX}$ | Ceil(5 × P × N) × $T_{DRX}$ |

$T_{SSB}$ refers to the periodicity of the SSB configured for RLM. $T_{DRX}$ refers to the DRX cycle length. $T_{Evaluate\_out\_SSB}$ refers to the evaluation period of out-of-synch condition. $T_{Evaluate\_in\_SSB}$ refers to the evaluation period of in-synch condition. P refers to a factor that depends on the overlapping of SSBs and measurement gaps. Ceil( ) refers to a ceiling function. N refers to a scaling factor depending on, e.g., the reference signals configuration (e.g., N = 1).

Some examples of configuration for CSI-RS-based RLM are provided below in Table 3 and Table 4.

TABLE 3

Examples of evaluation period $T_{Evaluate\_out\_CSI-RS}$ and $T_{Evaluate\_in\_CSI-RS}$ for FR1 in terms of different DRX configurations

| Configuration | $T_{Evaluate\_out\_SSB}$ (ms) | $T_{Evaluate\_in\_SSB}$ (ms) |
|---|---|---|
| no DRX | Max(200, Ceil($M_{out}$ × P) × $T_{CSI-RS}$) | Max(100, Ceil($M_{in}$ × P) × $T_{CSI-RS}$) |
| DRX cycle ≤ 320 ms | Max(200, Ceil(1.5 × $M_{out}$ × P) × Max($T_{DRX}$, $T_{CSI-RS}$)) | Max(100, Ceil(1.5 × $M_{in}$ × P) × Max($T_{DRX}$, $T_{CSI-RS}$)) |
| DRX cycle > 320 ms | Ceil($M_{out}$ × P) × $T_{DRX}$ | Ceil($M_{in}$ × P) × $T_{DRX}$ |

$T_{CSI-RS}$ refers to the periodicity of CSI-RS resource configured for RLM. This table applies for $T_{CSI-RS}$ equal to 5 ms, 10 ms, 20 ms or 40 ms. $T_{DRX}$ refers to the DRX cycle length. $T_{Evaluate\_out\_SSB}$ refers to the evaluation period of out-of-synch condition. $T_{Evaluate\_in\_SSB}$ refers to the evaluation period of in-synch condition. P refers to a factor that depends on the overlapping of SSBs and measurement gaps. Ceil( ) refers to a ceiling function. $M_{in}$ and $M_{out}$ refer to scaling factors that depend on, e.g., the reference signals configuration (e.g., $M_{in}/M_{out}$ = 10 or 20).

TABLE 4

Examples of evaluation period $T_{Evaluate\_out\_CSI-RS}$ and $T_{Evaluate\_in\_CSI-RS}$ for FR2 in terms of different DRX configurations

| Configuration | $T_{Evaluate\_out\_SSB}$ (ms) | $T_{Evaluate\_in\_SSB}$ (ms) |
|---|---|---|
| no DRX | Max(200, Ceil($M_{out}$ × P × N) × $T_{CSI-RS}$) | Max(100, Ceil($M_{in}$ × P × N) × $T_{CSI-RS}$) |
| DRX cycle ≤ 320 ms | Max(200, Ceil(1.5 × $M_{out}$ × P × N) × Max($T_{DRX}$, $T_{CSI-RS}$)) | Max(100, Ceil(1.5 × $M_{in}$ × P × N) × Max($T_{DRX}$, $T_{CSI-RS}$)) |
| DRX cycle > 320 ms | Ceil($M_{out}$ × P × N) × $T_{DRX}$ | Ceil($M_{in}$ × P × N) × $T_{DRX}$ |

$T_{CSI-RS}$ refers to the periodicity of CSI-RS resource configured for RLM. This table applies for $T_{CSI-RS}$ equal to 5 ms, 10 ms, 20 ms or 40 ms. $T_{DRX}$ refers to the DRX cycle length. $T_{Evaluate\_out\_SSB}$ refers to the evaluation period of out-of-synch condition. $T_{Evaluate\_in\_SSB}$ refers to the evaluation period of in-synch condition. P refers to a factor that depends on the overlapping of SSBs and measurement gaps. Ceil( ) refers to a ceiling function. N refers to a scaling factor depending on, e.g., the reference signals configuration (e.g., N = 1). $M_{in}$ and $M_{out}$ refer to scaling factors that depend on, e.g., the reference signals configuration (e.g., $M_{in}/M_{out}$ = 10 or 20).

In the above tables, $M_{out}$=20 and $M_{in}$=10, if the CSI-RS resource configured for RLM is transmitted with higher layer CSI-RS parameter density set to 3 and over the bandwidth ≥24 physical resource blocks (PRBs).

The UE may have to perform the beam failure detection (BFD) by performing measurements of RSs configured for BFD purposes (e.g., BFD measurements) and, if needed, it may perform the associated recovery procedure which is used for indicating to the serving gNB of a new SSB or CSI-RS when beam failure is detected on the serving SSB(s)/CSI-RS(s). Beam failure may be detected by counting beam failure instance indications from the lower layers to the MAC entity. RRC may configure BeamFailureRecoveryConfig and RadioLinkMonitoringConfig configurations for the BFD and recovery procedure and RLM.

As described above, aspects of RLM and BFD measurements may be defined based on the DRX cycle of the UE and the RLM-RS periodicity. The RLM-RS period may be a cell-wise parameter (based on the serving cell's SSB transmission period) or a UE-specific parameter (based on CSI-RS resources configured for RLM and/or BFD). The RLM-RS periodicity may not be expected to be too large in typical scenarios and up to a few tens of ms. The DRX cycle length can be set to between 10 ms and 10.24 seconds for UEs in RRC connected state. Therefore, the RLM and BFD measurements may be relaxed depending on the DRX cycle setting. For example, using the values from Table 1 (considering P=1), a UE may have an in-sync evaluation period of 800 ms and 3.2 seconds with a DRX cycle length of 160 ms and 640 ms, respectively, regardless of its mobility pattern.

On the contrary, if RLM and BFD measurements are defined based on the DRX cycle, then when configuring short DRX cycle length, no or limited relaxation of RLM and BFD measurements can be achieved regardless of its mobility pattern. The configuration of the DRX cycle may be just related to the characteristics of the data traffic and/or application needed by the UE, and may particularly reflect a trade-off between an acceptable latency that a given UE and/or application can tolerate and UE power consumption, rather than accounting for the mobility patterns and location in the cell of the UE.

Hence, if RLM and BFD measurements are defined based on the DRX cycle, whenever the UE is configured with a small value of the DRX cycle (e.g., 10-40 ms), the resulting frequency of RLM and BFD measurements may be unnecessarily large. This may occur if the UE is in low mobility since its measurements may change slowly. Additionally, this may occur if the UE is at a cell center since its measurements may reflect a good radio channel. Additionally, if the UE is at the cell center and with low mobility, it may be expected that the good channel quality may be maintained during a large time period. In this case, the UE may be too frequently and unnecessarily performing power consuming measurements for BFD and/or RLM purposes, but may still indicate the same indication status (likely IS) to higher layers as the channel conditions may not change (nor degrade) within the short evaluation periods.

Therefore, the relaxation of the RLM and/or BFD measurements performed by a UE in a radio resource control (RRC) connected state may be incorporated into a communication system (e.g., NR) for UE power saving. The same considerations may apply also to the radio resource management (RRM) measurements performed by a UE in the RRC connected state. However, if the UE is configured with a short DRX cycle (e.g., 10-40 ms) and RLM and/or BFD relaxation is enabled, the power saving from the RLM and/or BM relaxation may not be significant as the UE may be configured to wake up at each DRX cycle for monitoring a wake-up signal (WUS) (if configured) or the DRX On-Duration (if WUS is not configured). The wake-up signal (WUS) may be a PDCCH-based feature, which may indicate to a RRC Connected UE whether or not to monitor the next DRX On Duration, potentially reducing PDCCH monitoring energy consumption. As such, it may be beneficial to allow the combination of RLM and/or BM relaxation and PDCCH monitoring relaxation at the same time to obtain more significant UE power saving. For the same reasons, it may be beneficial to combine the skipping and the lack of skipping of RLM and/or BFD relaxation together with other measurement activities such as layer 1 reference signal received power (L1-RSRP).

Some embodiments described herein may provide for handling of measurements relaxation and other activity skipping. For example, in one embodiment, the UE may relax its RLM, BFD, RRM, and/or the like measurements if one or more radio link quality-based relaxation conditions are satisfied and based on whether the UE is also allowed, at the same time, to skip other activities, such as PDCCH, physical downlink shared channel (PDSCH) monitoring, and/or L1-RSRP measurements. For example, although the UE is allowed to apply RLM, BFD, RRM, and/or the like measurements relaxation according to radio link quality-based relaxation conditions, in an embodiment, the UE may not apply such relaxation when the UE is not allowed to skip one or more other activities. For example, according to an embodiment, no RLM, BFD, RRM, and/or the like measurements relaxation may be applied if the UE is in active data transmissions and/or if an inactivity timer is not running. Based on certain embodiments, the UE may perform the measurements (e.g., it may not apply the measurement relaxation although the radio link quality-based relaxation conditions are fulfilled), if another activity has to be performed since relaxation would not provide any power saving benefit under such situation. In this way, the relaxation can be applied if the UE can sleep or enter a similar operational mode (e.g., if activities are relaxed in a DRX cycle), thereby saving power of the UE that would otherwise be consumed attempting to relax measurements at a time when the UE has to perform operations in an awake operational mode.

In certain embodiments, when allowed to relax the measurements based on the configured radio link quality-based relaxation conditions, the UE may enter, pause, or cease relaxation of RLM, BFD, RRM, and/or the like measurements of its serving cell if it receives a WUS that indicates to enter, pause, or cease such relaxation. A WUS may be used as a condition to control measurements relaxation. In some embodiments, certain signalling flags (e.g., ps-TransmitPeriodicL1-RSRP and/or ps-TransmitPeriodicCSI flags and/or RRC signalling) may allow skipping of the periodic L1-RSRP reporting and/or CSI-RS reporting, and the UE may determine whether to relax a measurement based on such signalling flags in addition to a radio link quality based condition.

In certain embodiments, when allowed to relax the measurements based on the configured radio link quality-based relaxation conditions, the UE may enter, pause, or cease relaxation of BFD and/or RRM measurements of a secondary cell (Scell) if it receives a dormancy indication that indicates to enter, pause, or cease such relaxation in a (non-)dormant bandwidth part (BWP). The dormancy indication may be used as a condition to control measurements relaxation.

In certain embodiments, when allowed to relax the measurements based on the configured radio link quality-based relaxation conditions, the UE may skip BFD measurements during DRX On-Durations if L1-RSRP measurements and/or reporting can be skipped. Additionally, or alternatively, the UE can be configured to upper bound the BFD relaxation level (scaling factor) allowed by the radio link quality-based relaxation conditions and/or by other measurement cycles (e.g., L1-RSRP measurement period or reporting period), if such are configured. In a communication system, periodic L1-RSRP measurements may be skipped during a DRX On-Duration if neither WUS is present before the DRX On-Duration nor a scheduling downlink control information (DCI) is present in the DRX On-Duration. Certain signalling flags (e.g., ps-TransmitPeriodicL1-RSRP and/or ps-TransmitPeriodicCSI flags and/or RRC signalling) may allow skip the reporting of the periodic L1-RSRP and/or CSI-RS measurements. When these flags indicate the allowance to skip the reporting of the periodic L1-RSRP and/or CSI-RS measurements, the UE may skip, e.g., BFD measurements when the corresponding configured radio link quality-based relaxation conditions are fulfilled. Therefore, in some embodiments, the UE may determine whether to relax a measurement based on such signalling flags in addition to a radio link quality based condition.

In certain embodiments, the UE may be allowed to relax RLM, BM, RRM, and/or the like measurements if just certain radio link quality-based relaxation conditions related to low mobility and/or cell center are satisfied. Alternatively, in some embodiments, the UE may be allowed to relax RLM, BFD, RRM, and/or the like measurements if both such radio link-based relaxation conditions are satisfied and at least one additional condition is satisfied or an indication is present (according to a condition and/or indication as described above).

FIG. 1 illustrates an example 100 of handling of measurement relaxation and other activity skipping, according to some embodiments. As illustrated in FIG. 1, the example 100 includes a UE and a network node. The operations illustrated at 102 through 108 may be operations of the UE or the network node according to various embodiments. As illustrated at 102, the network node may send, to the UE, a configuration on condition for relaxation of a measurement (e.g., a RLM, BFD, RRM, and/or the like measurement). The configuration may indicate at least one of whether a radio link quality-based condition only or both the radio link quality-based condition and at least one user equipment activity-based additional condition is required to be evaluated to determine the relaxation of the measurement, or a configuration on the at least one user equipment activity-based additional condition. The user equipment activity-based additional condition may include, e.g., a condition that a UE activity in addition to the measurement is allowed to be skipped or relaxed.

As illustrated at 104, the UE may determine whether the radio link quality-based condition for relaxation of a measurement is satisfied. As illustrated at 106, the UE may determine whether the user equipment activity-based additional condition is satisfied. The determining at 106 may be based on whether a wake up signal ordering the UE to monitor a DL control signal during a DRX ON duration is received, whether a wake up signal indicating the UE to skip monitoring of a DL control signal during a DRX ON duration is received, whether a wake up signal indicating the user equipment to activate the relaxation of the measurement is received, whether a wake up signal ordering the UE to stop relaxing or skipping the measurement is received, whether a wake up signal ordering the UE to stop relaxing or skipping the measurement is received, whether a dormancy indication indicating that a bandwidth part has become non-dormant is received, whether a dormancy indication indicating that a bandwidth part has become dormant is received, whether a dormancy indication indicating the user equipment to activate the relaxation of the measurement is received, whether a dormancy indication ordering the UE to stop relaxing or skipping the measurement on the associated bandwidth part is received, and/or whether a layer 1 RSRP measurement and/or report is allowed to be skipped. As illustrated at 108, if both the radio link quality-based condition and the user equipment activity-based additional condition are satisfied, then the UE may determine that relaxation for the measurement is allowed to be performed.

The above-described operations are further described below with respect to several example embodiments. With respect to a first example embodiment, the UE may enter, pause, or cease relaxation of RLM, BFD, RRM, and/or the like measurements of its serving cell if, when allowed to relax the measurements based on the configured radio link quality-based relaxation conditions, it receives a WUS that indicates to enter, pause, or cease such relaxation. In some embodiments, the network node may indicate to the UE that one or more DRX On-Durations can be skipped either from an RLM, BFD, RRM, and/or the like measurements perspective or both from an RLM, BFD, RRM, and/or the like measurements and PDCCH monitoring perspectives. Based on such indication and a radio link quality-based condition being satisfied, the UE may determine that the RLM, BFD, RRM, and/or the like measurements is allowed to be relaxed. In some embodiments, the network node may use a WUS (also referred to as DCI with cyclic redundancy check (CRC) scrambled by power saving radio network temporary identifier (PS-RNTI) (DCP)) to provide such an indication. For example, a new interpretation of the WUS or an extension of the WUS's bits and/or content may be used to provide such indication.

In some embodiments, a WUS can indicate either measurement relaxation allowance or measurement relaxation pause or cease. In certain embodiments, where the UE is allowed to relax a measurement (e.g., RRM, RLM, BFD, and/or the like measurements) (e.g., the UE may not have to measure the configured RSs during the DRX on-Duration-Timer), the network node may send a WUS to trigger the UE to update the relaxed measurement(s), e.g., the WUS may trigger the UE to perform the measurements. The UE, when it receives a WUS, may consider whether there are any RSs associated with the relaxed measurements (RRM, RLM, BFD, and/or the like) occurring during the subsequent DRX On-Duration timer and may activate the measurements on the RSs. A WUS may trigger measurement relaxation to cease or pause. In some examples, even though relaxation may be allowed based on other criteria and rules (which may be radio link quality-based), measurements may have to be made if the UE receives WUS triggering for monitoring the DRX On-Duration timer, even if no scheduling DCI is present and/or detected (during the DRX On-Duration time). For example, the measurements may be triggered by the WUS. In some examples, the WUS can indicate ceasing relaxations for a certain number of DRX cycles and/or subsequent DRX On-Durations.

In some embodiments, the network may configure the UE, e.g., using higher layer signalling and/or RRC signalling, with a WUS configuration including information regarding whether the presence of the WUS (targeted to the UE) indicates skipping of one or multiple consecutive DRX On-Durations allows a combination of skipping PDCCH monitoring and RLM, BFD, RRM, and/or the like measurements during the skipped DRX On-Durations (referred to herein as "On-Duration dependent relaxation information"). The information can indicate BFD relaxation, RLM relaxation, RRM relaxation, or a combination of one or more of these. The information can indicate that the UE is allowed to relax RLM, BFD, RRM, and/or the like measurements if it is configured (indicated) that N consecutive DRX On-Durations can be skipped. The information can indicate that the UE is not allowed to relax RLM, BFD, RRM, and/or the like measurements if it is configured (indicated) that just one DRX On-Duration can be skipped.

If configured (e.g., based on DRX On-Duration-dependent relaxation information), the UE can relax its RLM, BFD, RRM, and/or the like measurements by skipping a corresponding measurement during a DRX cycle if the DRX On-Duration can be skipped in that DRX cycle and radio link quality-based condition is satisfied. Alternatively or additionally, the UE can skip RLM, BFD, RRM, and/or the like measurements during at least some part of the DRX cycle that precedes and/or some DRX cycles that follow a DRX cycle in which the DRX On-Duration can be skipped. The UE may omit measurements during a certain number of DRX cycles that follow a DRX cycle in which DRX On-Duration skipping is allowed. The radio link quality-based relaxation conditions for RLM, BFD, RRM, and/or the like measurements relaxation may be related to, e.g., low-mobility and/or a location of the user equipment or a detection error rate or power of a signal received by the user equipment. For example, if the user equipment has a low mobility and it is not at a cell edge, the radio link quality-based relaxation condition may be determined as being satisfied. Alternatively, or additionally, if a block error rate (BLER) of the user equipment is below a threshold, the radio link quality-based relaxation condition may be determined as being satisfied. In another embodiment, if RSRP of the user equipment is above a threshold, the radio link quality-based relaxation condition may be determined as being satisfied.

With respect to a second embodiment, the UE may be allowed to enter, pause, or cease relaxation of a measurement (e.g., BFD, and/or RRM measurements of a secondary cell) if, when allowed to relax the measurements based on the configured radio link quality-based relaxation conditions, it receives a dormancy indication that indicates to enter, pause, or cease such relaxation in a (non-)dormant BWP. A dormancy indication for a SCell can trigger the UE to enter, pause, or cease measurement relaxation for the SCell (e.g., PSCell), if it fulfils the radio link quality-based relaxation conditions and if the dormancy indication for such SCell indicates to enter, pause or cease measurement relaxation. In one example, a dormancy indication can trigger to cease (or stop or exit), e.g., BFD and/or RRM measurement relaxation of a non-dormant BWP. In some examples, this may be implicit or explicitly indicated. In another example, a dormancy indication can trigger entering, e.g., BFD and/or RRM measurements relaxation of a dormant BWP. The dormancy indication can be carried via a WUS DCI, or DCI format 1_1 or 0_1, or via a medium access control control element (MAC CE).

With respect to a third embodiment, when allowed to relax the measurements based on the configured radio link quality-based relaxation conditions, the UE may skip a measurement (e.g., BFD measurement) during DRX On-Durations if L1-RSRP measurements and/or reporting is allowed to be skipped. Additionally, or alternatively, the UE may be configured to upper bound the BFD relaxation level (scaling factor) allowed by the radio link quality-based relaxation conditions and/or by other measurement cycles (e.g., L1-RSRP measurement period or reporting period), if such are configured. In one example, BFD measurements can be skipped during DRX On-Durations if L1-RSRP measurements and/or reporting can be skipped. BFD measurements may not be skipped if L1-RSRP measurements and/or reporting can be performed. The UE may relax BFD measurements if L1-RSRP measurements are allowed to be skipped outside the DRX On-Duration. In some embodiments, when L1-RSRP measurements are required to be performed, the UE should also perform BFD measurements regardless of the radio link quality-based relaxation status. In some embodiments, periodic L1-RSRP measurements may be skipped during the DRX On-Duration if neither a WUS is present nor a scheduling DCI is present in the DRX On-Duration. Therefore, in some embodiments, the UE may determine whether relaxation of a measurement is allowed based on whether a WUS is present or whether a scheduling DCI is present in the DRX On-Duration. In some embodiments, certain flags (e.g., in RRC signalling) may indicate to skip the periodic L1-RSRP reporting and/or CSI-RS. In another example, the level of the BFD measurements relaxation, which may be allowed based on the radio link quality-based relaxation conditions, can be reduced when the L1-RSRP resources (e.g., reference signal resources for L1-RSRP) do not occur in the On Duration.

The BFD relaxation level may be upper bounded by other measurement cycles (e.g., a L1-RSRP measurement period or reporting period) if such are configured. For example, a UE may be configured with, e.g., 20 ms DRX cycle and, e.g., 80 ms (CSI-RS and/or SSB) RS period. The RS period can be either the L1-RSRP measurement period or L1-RSRP measurement reporting period, defined by the PUCCH resource cycle. This may cause the UE to have to measure and/or report L1-RSRP, e.g., every 4th DRX cycle at most. The level of BFD relaxation, which may be allowed based on the radio link quality-based relaxation conditions, may be adjusted by applying a scaling factor equal to, e.g., 8 (e.g., BFD measurements can be performed every 8th DRX cycle). However, the scaling factor applied to BFD relaxation may then be upper bounded by a L1-RSRP RS period. Thus, the BFD scaling factor may be a maximum (e.g., an allowed radio scaling factor, L1 RSRP RS period)=4. In this case, the BFD measurements may have to be performed every 4th DRX cycle.

The RS resources for BFD and the other measurements can be different. The resources for both types of measurements can occur at the same time and the UE may not be able to measure both at the same time. The same scaling (e.g., P) used in FR2 may be used in this case.

A similar upper bound can also apply to the BFD measurements performed on the Scell (e.g., PSCell). As the RS periods for the L1-RSRP measurements could be different for PCell and Scell, a cell-specific upper bound can apply. The network node may configure the UE, e.g., using an RRC signalling, or may indicate to the UE via, e.g., a WUS, DCI, MAC CE, and/or the like on whether the UE is allowed or not to relax BFD measurements and/or to upper bound the relaxation level based on other measurements cycles (e.g., L1-RSRP) as described above (referred to herein as "L1-RSRP dependent relaxation information"). The L1-RSRP dependent relaxation information may be implemented as a flag. If such a flag is set, then the UE may not relax BFD measurements if L1-RSRP measurements are to be made outside the DRX On-Duration and vice-versa, irrespective of whether the DRX On-Duration can be skipped. The radio link quality-based relaxation conditions for RLM, BFD, RRM, and/or the like measurements relaxation can be based, e.g., on low-mobility and/or not-at-cell-edge.

With respect to a fourth embodiment, the UE may relax RLM, BM, RRM, and/or the like measurements either if just certain radio link quality-based relaxation conditions related to low mobility and/or cell center are satisfied, or if both such radio link quality-based relaxation conditions are satisfied and at least any additional condition is satisfied or indication is present, according to conditions and/or indications described above. The RRC configuration may instruct the UE on whether the allowance to apply the RLM, BM, RRM, and/or the like relaxation is conditioned on fulfilling certain radio link quality-based relaxation conditions. Allowance may also be conditioned on an additional condition and/or indication (e.g., based on L1-RSRP and/or DRX On-Duration-dependent relaxation information, as described above).

In certain implementations with respect to this fourth example embodiment, the UE may be configured to be allowed to relax RLM measurements, conditioned on that the serving cell quality is sufficient, without additional conditions and/or flags to consider. In this case, the network may configure the UE with various relaxation thresholds and additional information allowing UE to relax RLM measurements with a level of relaxation (e.g., scaling factor 2), and with an additional condition and/or flag disabled.

For the radio link quality-based relaxation conditions, various approaches can be used. A first example approach may include a network-assisted radio link quality-based relaxation approach. The UE may evaluate the configured and/or defined radio link quality-based relaxation conditions against network-defined thresholds. The UE may be allowed to relax RLM, BM, RRM, and/or the like measurements based on radio quality whenever these radio link quality-based relaxation conditions are satisfied (e.g., without an explicit network indication). Based on UE measurements, if the serving cell quality is better than a threshold, the UE may apply RLM or BFD or additional serving cell RRM measurement relaxation. Otherwise, the UE may not be allowed to apply RLM or BFD or additional serving cell RRM measurement relaxation. The conditions can be based on metrics reported by the UE to the network (e.g., a reported serving cell and/or serving beam layer 3 (L3) or L1 RSRP and/or wideband channel quality indicator (CQI) or signal-to-interference-and-noise-ratio (SINR) values), which may allow the network to be able to evaluate the same conditions (based on the reported metrics) and become aware of when the UE is allowed to relax RLM, BM, RRM, and/or the like measurements. The conditions and/or thresholds for relaxation may be different for BM, RLM, RRM, etc.

A second example approach may include a network-controlled radio link quality-based relaxation approach. The network node may evaluate the RLM, BM, RRM, and/or the like radio link quality-based relaxation condition(s) based on reported metrics and internal-thresholds. If the network node determines that relaxation is allowed, the network node may send a RLM, BM, RRM, and/or the like relaxation allowance indication to the UE, e.g., the UE may be allowed to relax the RLM, BM, RRM, and/or the like measurements upon receiving an explicit network indication and until the network indicates a stop of the relaxation, or another exit indication triggers occur, such as a WUS.

For example, low mobility and/or cell center conditions can be evaluated based on a variation (e.g., an absolute value) of RSRP and/or wideband CQI and/or SINR based on the last number (N) (e.g., 5) reported values. The network may configure the UE to report certain metrics (e.g., serving cell and/or serving beam RSRP and/or wideband CQI/SINR). The network may send, e.g., a WUS indication about the allowance to skip DRX On-Durations for both RLM, BM, RRM, and/or the like measurements and PDCCH, if the RLM, BM, RRM, and/or the like radio link quality-based relaxation conditions are satisfied.

A third example approach may include a UE-autonomous radio link quality-based relaxation approach. For example, it may be up to the UE to determine whether it is safe to apply RLM, BM, RRM, and/or the like relaxation.

In some embodiments, the UE may be configured to evaluate one or more UE activity-based conditions in addition to the above radio link quality-based condition, in order to determine whether a measurement is allowed to be relaxed.

As described above, FIG. 1 is provided as an example. Other examples are possible, according to some embodiments.

FIG. 2 illustrates an example signal diagram 200 for handling of measurement relaxation and other activity skipping, according to an embodiment. As illustrated in FIG. 2, the example 200 includes a UE and a network node (e.g., a gNB).

As illustrated at 202, the UE may be connected to the network node in an RRC connected mode. As illustrated at 204, the network node may transmit, to the UE, a measurement configuration of RRM and/or RLM-RS (for RLM and/or BFD). This measurement configuration may include radio link quality-based relaxation information, a scaling factor, and/or L1-RSRP-dependent relaxation information, and/or DRX On-Duration-dependent relaxation information. As illustrated at 206, the network node may transmit, to the UE, a WUS and/or DCP configuration. This configuration may include DRX On-Duration-dependent relaxation information.

As illustrated at 208, the UE may perform RLM, BFD, RRM, and/or the like measurements according to the measurement configuration. As illustrated at 210, the UE may determine if the UE is allowed to relax the RLM, BFD, RRM, and/or the like measurements based on radio relation information (e.g., serving cell SS-RSRP is greater than or exceeds a threshold) and further relaxation information. For example, the further relaxation information may be used to determine whether an additional UE activity-based condition is satisfied. The further relaxation information may be received from an explicit signaling from the network or determined implicitly by the UE. The UE may measure the RLM-RS and/or SSBs at 212 and 214 according to DRX without relaxation. As illustrated at 216, the UE may determine that the serving cell SS-RSRP is greater than or exceeds a threshold. As illustrated at 218, the UE may apply RLM, BFD, RRM, and/or the like relaxation based on the determination at 210.

The above procedure may be repeated. As illustrated at 220, the UE may perform RLM, BFD, RRM, and/or the like measurements according to the measurement configuration, for example, in a manner similar to that described above at 208. As illustrated at 222, the UE may determine if the UE is allowed to relax RLM, BFD, RRM, and/or the like measurements, for example, in a manner similar to that at 210. The UE may measure the RLM-RS and/or SSBs at 224, 226 according to relaxation with the scaling factor (X) (e.g., DRX*X). As illustrated at 228, the network node may transmit, to the UE, a WUS indicating a pause and/or cease RLM, BFD, RRM, and/or the like relaxation for a number (N) DRX cycles. Similar to the above at 216, the UE may, at 230, perform the determination that the serving cell SS-RSRP is greater than or exceeds a threshold. As illustrated at 232, based on the indication received at 228, the UE may pause and/or cease RLM, BFD, RRM, and/or the like relaxation for N DRX cycles, though the radio link quality-based relaxation condition is determined to be satisfied at 230.

As indicated above, FIG. 2 is provided as an example. Other examples are possible, according to some embodiments.

Figure 3:
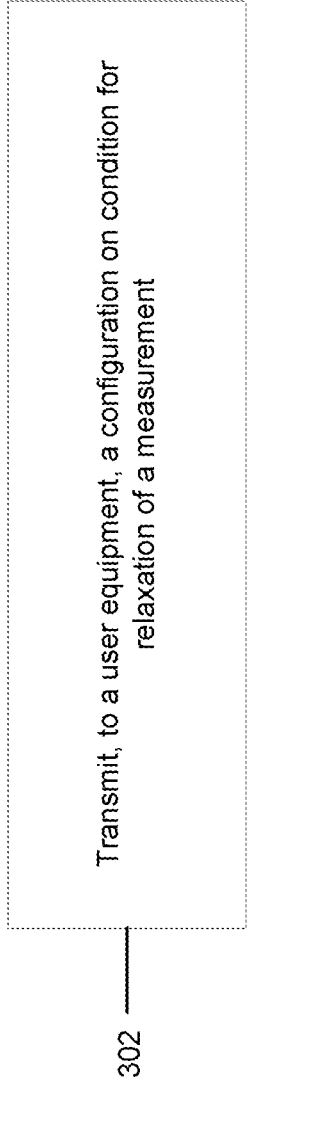
FIG. 3 illustrates an example flow diagram of a method, according to some embodiments.

FIG. 3 illustrates an example flow diagram of a method 300, according to some embodiments. For example, FIG. 3 may illustrate example operations of a network node (e.g., apparatus 10 illustrated in, and described with respect to, FIG. 5a). Some of the operations illustrated in FIG. 3 may be similar to some operations shown in, and described with respect to, FIGS. 1 and 2.

In an embodiment, the method 300 may include, at 302, transmitting, to a user equipment, a configuration on condition for relaxation of a measurement. The configuration may indicate at least one of whether a radio link quality-based condition only or both the radio link quality-based condition and at least one user equipment activity-based additional condition is required to be evaluated to determine the relaxation of the measurement, or a configuration on the at least one user equipment activity-based additional condition. The transmitting at 302 may be performed, for example, in a manner similar to that at 102 of FIG. 1. The configuration may be transmitted to the UE via a RRC message.

The method illustrated in FIG. 3 may include one or more additional aspects described below or elsewhere herein. In certain embodiments, the configuration on condition for relaxation of the measurement may further indicate a configuration on the radio link quality-based condition. For example, the configuration may include a threshold value for evaluating a radio link quality based condition. Alternatively or additionally, the configuration may define either different use or interpretation of, e.g., WUS, or bits in the WUS. The definition may be used by the UE to determine implicitly or explicitly whether at least one UE activity-based condition for the relaxation is satisfied. In certain embodiments, the at least one user equipment activity-based additional condition may comprise at least one user equipment activity in addition to the measurement is allowed to be skipped or relaxed. For example, the user equipment activity may include one or more of PDCCH monitoring, L1-RSRP measurement, or L1-RSRP reporting. In certain embodiments, the at least one user equipment activity-based additional condition may comprise at least one of: a wake up signal ordering the user equipment to monitor a downlink control signal during a discontinuous reception on duration is not received, a wake up signal indicating the user equipment to skip monitoring of a downlink control signal during a discontinuous reception on duration is received, a wake up signal indicating the user equipment to activate the relaxation of the measurement is received, a wake up signal ordering the user equipment to stop relaxing or skipping the measurement is not received, a dormancy indication indicating that a bandwidth part has become non-dormant is not received, a dormancy indication indicating that a bandwidth part has become dormant is received, a dormancy indication indicating the user equipment to activate the relaxation of the measurement is received, a dormancy indication ordering the user equipment to stop relaxing or skipping the measurement on the associated bandwidth part is not received, or a layer 1 reference signal received power measurement or report is allowed to be skipped.

In certain embodiments, the method 300 may further comprise transmitting a wake up signal that indicates the user equipment to enter or stop the relaxation of the measurement, in an explicit or implicit way. For example, the WUS may order the user equipment to monitor a downlink control signal during a discontinuous reception on duration, and this may serve as an implicit indication that measurement relaxation is not allowed or measurement relaxation should be stopped. In certain embodiments, the method 300 may further comprise transmitting a dormancy indication that indicates the user equipment to enter or stop the relaxation of the measurement on a bandwidth part, in an explicit or implicit way. For example, the dormancy indication may indicate that a bandwidth part has become dormant, and this may serve as an implicit indication that measurement relaxation based on radio link quality is allowed.

In certain embodiments, the configuration may further comprise a configuration of an upper bound for the relaxation of the measurement. In certain embodiments, the measurement relaxation may apply to at least one of a radio link monitoring measurement, a beam failure detection measurement, or a radio resource management measurement. This may allow a network to control various relaxation of measurements of a UE, which may help to ensure that the UE can apply relaxation if other activities can be skipped at the same time, thereby conserving power of the UE.

As described above, FIG. 3 is provided as an example. Other examples are possible according to some embodiments.

FIG. 4 illustrates an example flow diagram of a method 400, according to some embodiments. For example, FIG. 4 may illustrate example operations of a UE (e.g., apparatus 20 illustrated in, and described with respect to, FIG. 5*b*). Some of the operations illustrated in FIG. 4 may be similar to some operations shown in, and described with respect to, FIGS. 1 and 2.

In an embodiment, the method 400 may include, at 402, determining, by a user equipment, whether at least one radio link quality-based condition for relaxation of a measurement is satisfied, for example, in a manner similar to that at 104 of FIG. 1. The method 400 may include, at 404, determining whether at least one user equipment activity-based additional condition is satisfied, for example, in a manner similar to that at 106 of FIG. 1. The method 400 may include, at 406, if both the at least one radio link quality-based condition and the at least one user equipment activity-based additional condition are satisfied, determining that relaxation for the measurement is allowed to be performed. For example, the determining at 406 may be similar to that at 108 of FIG. 1.

The method illustrated in FIG. 4 may include one or more additional aspects described below or elsewhere herein. In certain embodiments, the at least one user equipment activity-based additional condition may comprise that at least one user equipment activity in addition to the measurement is allowed to be skipped or relaxed. In certain embodiments, the determining at 404 may further comprise determining whether at least one user equipment activity-based additional condition is satisfied based on at least one of whether a wake up signal ordering the user equipment to monitor a downlink control signal during a discontinuous reception on duration is received, whether a wake up signal indicating the user equipment to skip monitoring of a downlink control signal during a discontinuous reception on duration is received, whether a wake up signal indicating the user equipment to activate the relaxation of the measurement is received, whether a wake up signal ordering the user equipment to stop relaxing or skipping the measurement is received, whether a dormancy indication indicating that a bandwidth part has become non-dormant is received, whether a dormancy indication indicating that a bandwidth part becomes dormant is received, whether a dormancy indication indicating the user equipment to activate the relaxation of the measurement is received, whether a dormancy indication ordering the user equipment to stop relaxing or skipping the measurement on the associated bandwidth part is received, or whether a layer 1 reference signal received power measurement or report is allowed to be skipped.

In certain embodiments, the method 400 may further include receiving a configuration of the at least one radio link quality-based condition and/or the at least one user equipment activity-based additional condition, for example, in a manner similar to that at 102 of FIG. 1. In certain embodiments, either the radio link-quality-based conditions or the user equipment activity-based additional conditions may be preconfigured or predefined at the UE, while the other one is configured by the network node. In certain embodiments, the method 400 may further include receiving a signal, and based on a determination that the relaxation for the measurement is allowed to be performed, performing a relaxed measurement of the signal. Relaxing measurements may save power of the UE. For example, by increasing the measurement period, the measurement sampling can be more infrequent, allowing the UE to skip some measurements and thereby saving power. In another example, the number of measurement samples may be reduced (e.g., for RLM/BFD evaluations) also when their interspacing (sampling interval) is not reduced, which also results in power saving for the skipped measurement samples. Like-wise power can be saved by relaxing a measurement reporting interval. In certain embodiments, the method 400 may further include, based on receiving a wake up signal that indicates (implicitly or explicitly) the UE to enter the relaxation of the measurement and the at least one radio link quality-based condition being satisfied, determining that relaxation for the measurement is allowed to be performed. In some embodiments, the method 400 may further include, based on receiving a wake up signal that indicates (implicitly or explicitly) the UE to stop the relaxation of the measurement, determining that relaxation for the measurement is not allowed to be performed.

In certain embodiments, the method 400 may further include, based on receiving a dormancy indication that indicates (implicitly or explicitly) the UE to enter the relaxation of the measurement on a bandwidth part and the at least one radio link quality-based condition being satisfied, determining that relaxation for the measurement is allowed to be performed. In some embodiments, the method 400 may include, based on receiving a dormancy indication that indicates (implicitly or explicitly) the UE to stop the relaxation of the measurement on a bandwidth part, determining that relaxation for the measurement is not allowed to be performed. In certain embodiments, the method 400 may further comprise, based on a determination that a layer 1 reference signal received power measurement or reporting is allowed to be skipped and the at least one radio link quality-based condition being satisfied, determining that relaxation for the measurement is allowed to be performed.

In certain embodiments, the method 400 may further include determining an upper bound for a relaxation level of the measurement. In some embodiments, the upper bound may be determined based on a periodicity of a layer 1 measurement (e.g., RSRP measurement) and/or a periodicity of a layer 1 measurement reporting. In certain embodiments, the at least one radio link quality-based condition may be related to low mobility or a location of the user equipment or a detection error rate of the user equipment or power of a signal received by the user equipment. For example, the radio link quality-based condition may comprise a link condition indicating low mobility of the user equipment, a location of the user equipment not being at the cell edge, energy of a signal received being above a threshold, or a detection error being below a threshold. This may allow a network to control various relaxation of measurements of a UE, which may help to ensure that the UE can apply relaxation if other activities can be skipped at the same time, thereby conserving power of the UE without obvious system performance degradation. In certain embodiments, the method 400 may further include receiving a configuration indicating whether the radio link quality-based condition only or both the radio link quality-based condition and the at least one user equipment activity-based additional condition is to be evaluated to determine the relaxation of the measurement. In certain embodiments, the measurement may include at least one of a radio link monitoring measurement, a beam failure detection measurement, or a radio resource management measurement.

As described above, FIG. 4 is provided as an example. Other examples are possible according to some embodiments.

Figures 5A, 5B:
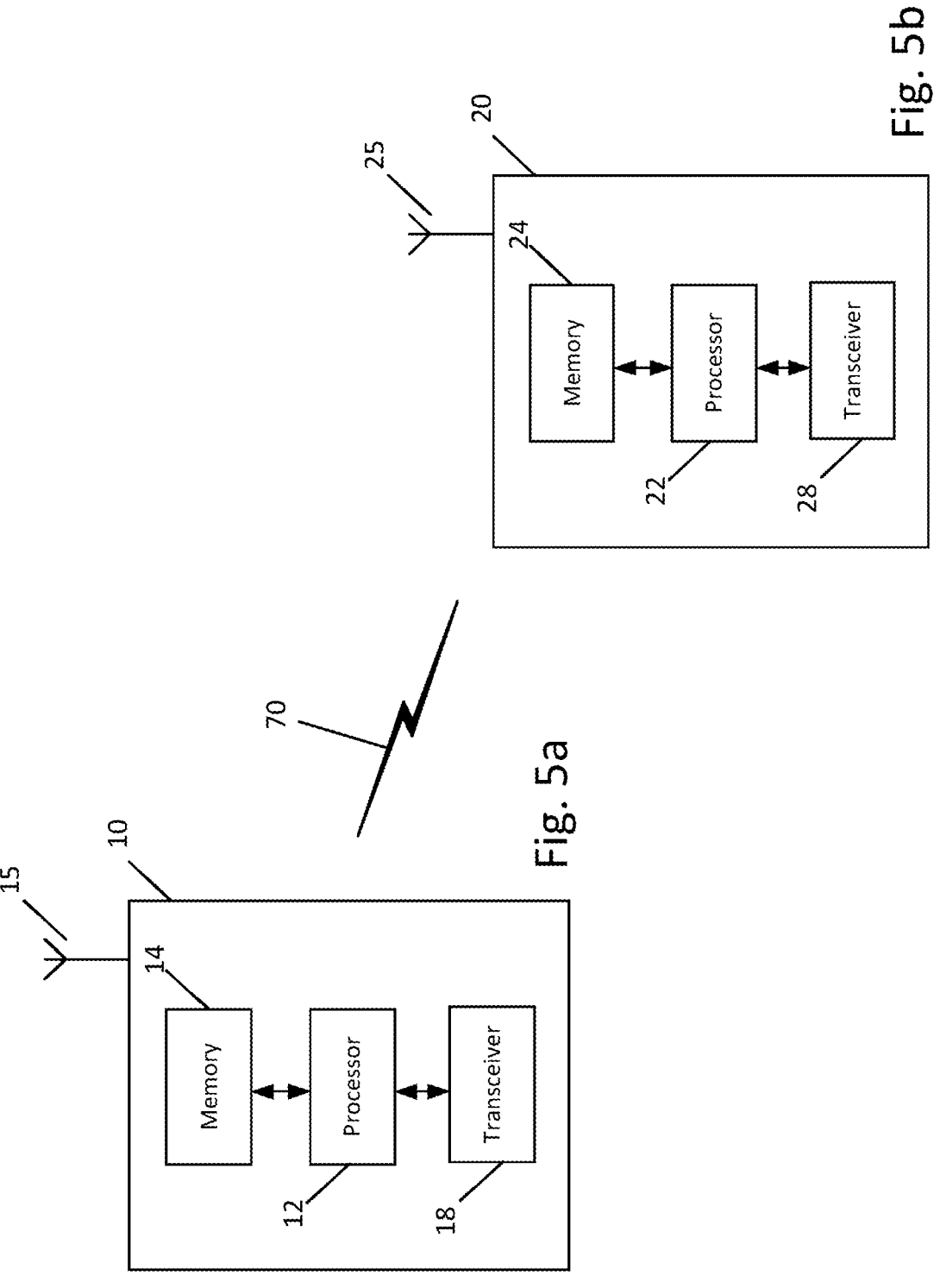
FIG. 5a illustrates an example block diagram of an apparatus, according to an embodiment.
FIG. 5b illustrates an example block diagram of an apparatus, according to another embodiment.

FIG. 5*a* illustrates an example of an apparatus 10 according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), and/or a WLAN access point, associated with a radio access network, such as a LTE network, 5G or NR. In some example embodiments, apparatus 10 may be an eNB in LTE or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 5*a*.

As illustrated in the example of FIG. 5*a*, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 5*a*, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like.

According to certain embodiments, apparatus 10 may be controlled by memory 14 and processor 12 to perform the functions associated with any of the embodiments described herein, such as some operations illustrated in, or described with respect to, FIGS. 1-3. For instance, apparatus 10 may be controlled by memory 14 and processor 12 to perform the method of FIG. 3.

FIG. 5*b* illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 5*b*.

As illustrated in the example of FIG. 5*b*, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 5*b*, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry. As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with any of the embodiments described herein, such as some operations illustrated in, or described with respect to, FIGS. 1-2 and 4. For instance, in one embodiment, apparatus 20 may be controlled by memory 24 and processor 22 to perform the method of FIG. 4.

In some embodiments, an apparatus (e.g., apparatus 10 and/or apparatus 20) may include means for performing a method or any of the variants discussed herein, e.g., a method described with reference to FIG. 3 or 4. Examples of the means may include one or more processors, memory, and/or computer program code for causing the performance of the operation.

Therefore, certain example embodiments provide several technological improvements, enhancements, and/or advantages over existing technological processes. For example, one benefit of some example embodiments is control of various relaxation of measurements of a UE, which may help to ensure that the UE can apply relaxation if other activities can be skipped at the same time, thereby conserving power of the UE. Accordingly, the use of some example embodiments results in improved functioning of communications networks and their nodes and, therefore constitute an improvement at least to the technological field of UE power consumption, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations used for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural language is used in connection with describing certain embodiments. For example, an embodiment that describes operations of a single network node equally applies to embodiments that include multiple instances of the network node, and vice versa.

One having ordinary skill in the art will readily understand that the example embodiments as discussed above may be practiced with operations in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

Partial Glossary

BFD Beam Failure Detection
BWP Bandwidth Part
CSI-RS Channel-state information reference signal
DRX Discontinuous Reception
FR1 Frequency Range 1
FR2 Frequency Range 2
gNB 5th Generation NB
IS In-Synch
NB-IoT Narrow-Band Internet of Things
NCGI NR Cell Global Identifier
OOS Out-Of-Synch
RAN Radio Access network
RLF Radio Link Failure
RLM Radio Link Monitoring
RLM-RS Radio Link Monitoring Reference Signal
RRC Radio Resource Control
RRM Radio resource Management
RS Reference Signal
RSRP Reference Signal Received Power
RSRQ Reference Signal Received Quality
SINR Signal to Interference and Noise Ratio
SMTC Synchronization Signal (SS)/Physical Broadcast Channel Block Measurement Timing Configuration
SSB SS Block
UE User Equipment

The invention claimed is:

1. An apparatus, comprising:
at least one processor; and
at least one memory comprising computer program code,
the at least one memory and computer program code configured, with the at least one processor, to cause the apparatus to:
    determine whether at least one radio link quality-based condition for relaxation of a measurement is satisfied;
    determine whether at least one user equipment activity-based additional condition is satisfied;
    in response to determining that both the at least one radio link quality-based condition and the at least one user equipment activity-based additional condition are satisfied, determine that relaxation for the measurement is allowed to be performed;
    receive a configuration of both of: the at least one radio link quality-based condition, and the at least one user equipment activity-based additional condition;
    receive a signal;
    determine whether relaxation for the measurement is allowed to be performed based on: the at least one radio link quality-based condition being satisfied, receiving a wake up signal that indicates to enter the relaxation of the measurement, receiving a dormancy indication that indicates to enter the relaxation of the measurement on a bandwidth part, and determining that a layer 1 reference signal received power measurement or reporting is allowed to be skipped;

determine whether relaxation for the measurement is not allowed to be performed based on: receiving a wake up signal that indicates to stop the relaxation of the measurement, and receiving a dormancy indication that indicates to stop the relaxation of the measurement on a bandwidth part;
    based on a determination that the relaxation for the measurement is allowed to be performed, perform a relaxed measurement of the signal;
    determine, prior to activating the relaxation for the measurement, whether at least one user equipment activity other than the measurement is scheduled to be performed during a period allocated for the relaxed measurement;
    delay or skip the relaxation for the measurement when the at least one user equipment activity other than the measurement is not allowed to be skipped during that period;
    determine an upper bound for a relaxation level of the measurement, wherein the upper bound is determined based on a periodicity of a layer 1 measurement and a periodicity of a layer 1 measurement reporting; and
    receive a configuration indicating whether the radio link quality-based condition both the radio link quality-based condition and the at least one user equipment activity-based additional condition is to be evaluated to determine the relaxation of the measurement,
    wherein the at least one user equipment activity-based additional condition comprises that at least one user equipment activity and the measurement is allowed to be skipped or relaxed,
    wherein the determining of whether the at least one user equipment activity-based additional condition is satisfied is based on: whether a wake up signal ordering the apparatus to monitor a downlink control signal during a discontinuous reception on duration is received, whether a wake up signal indicating the apparatus to skip monitoring of a downlink control signal during a discontinuous reception on duration is received, whether a wake up signal indicating the apparatus to activate the relaxation of the measurement is received, whether a wake up signal ordering the user equipment to stop relaxing or skipping the measurement is received, whether a dormancy indication indicating that a bandwidth part has become non-dormant is received, whether a dormancy indication indicating that a bandwidth part has become dormant is received, whether a dormancy indication indicating the apparatus to activate the relaxation of the measurement is received, whether a dormancy indication ordering the apparatus to stop relaxing or skipping the measurement on the associated bandwidth part is received, and whether a layer 1 reference signal received power measurement or report is allowed to be skipped, and
    wherein the at least one radio link quality-based condition is related low mobility of the user equipment, a location of the user equipment, a detection error rate of the user equipment, and power of a signal received by the user equipment.

* * * * *